United States Patent Office 3,292,574
Patented Dec. 20, 1966

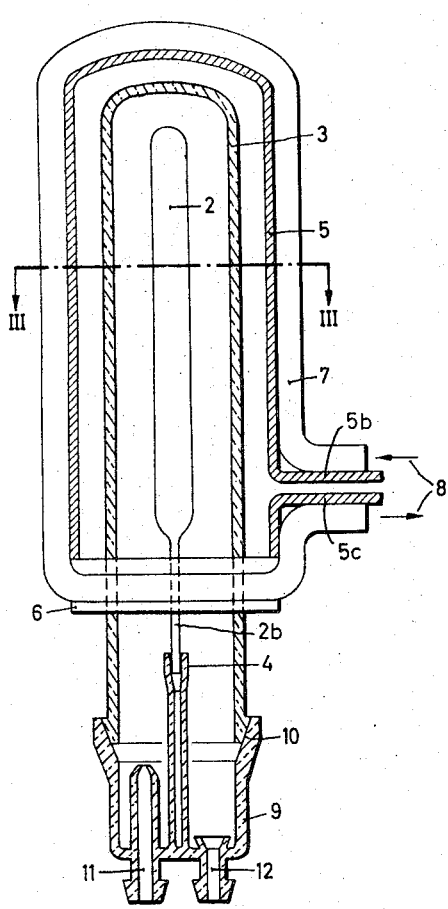
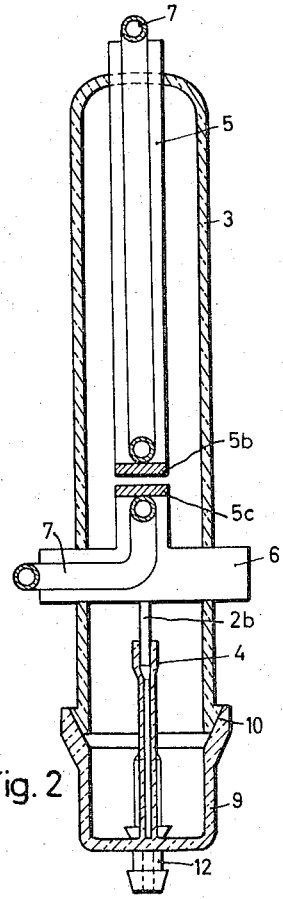
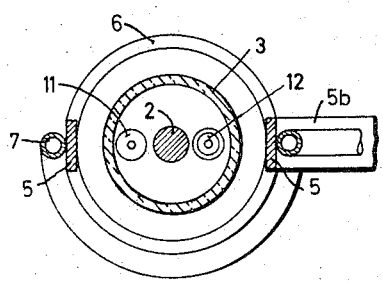
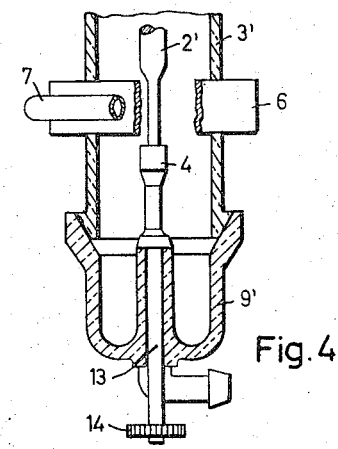
Fig.1
Fig.2
Fig.3
Fig.4

3,292,574
APPARATUS FOR PYROLYTIC PRECIPITATION OF SEMI-CONDUCTOR MATERIAL FROM A GASEOUS COMPOUND THEREOF
Wolfgang Keller and Günther Berger, Pretzfeld, and Otto Schmidt, Erlangen, Germany, assignors to Siemens-Schuckertwerke Aktiengesellschaft, Berlin-Siemensstadt, Germany, a corporation of Germany
Filed Jan. 24, 1964, Ser. No. 340,044
Claims priority, application Germany, Jan. 26, 1963, S 83,437
9 Claims. (Cl. 118—49.5)

Our invention relates to apparatus for performing a pyrolytic process of precipitating semiconductor material from a gaseous mixture, containing a thermally dissociable compound of the semiconductor material, upon a core body heated to the pyrolytic reaction temperature, a flow of the gas being supplied during the reaction and comprising the gaseous compound, preferably a halogenide of the semiconductor material, mixed with a gaseous diluting or reaction medium. Such processes and suitable reaction equipment are known, for example, from U.S. Patent 3,011,877. Thus, in the processing apparatus illustrated in Patent 3,011,877, two or more rod-shaped cores of silicon are supported in vertical position only at their respective lower ends within a reaction vessel. The upper ends of the core rods are electrically connected with each other, the rods being heated by connecting the mounted end of each rod to a pole of an electric current source, thereby heating the rods by electric current passing serially through the interconnected rods. While the core rods are heated, a flow of gas is passed through the reaction vessel, such gas consisting for example of a mixture containing hydrogen and silicon tetrachloride or silicochloroform. The silicon compound is reduced at the surface of the heated core rods and the dissociated silicon precepitates upon the rods.

It is an object of our invention to provide processing apparatus for the pyrolytic production of semiconductor materials generally in accordance with the above-described method, that allows reduction or elimination of the amount of metal or other relatively good conducting material in the interior of the reaction vessel. In so doing, we minimize or avoid a source of undesired impurity atoms that may become admixed to the gas and then reach the precipitating semiconductor material during the pyrolytic process. Another object of our invention is to devise processing equipment of the above-mentioned kind that permits electrical heating of an elongated core body simultaneously over the entire lentgh that is to receive the precipitating semiconductor material, without requiring the passage of electric current directly through the core body from one end thereof to the other. Thus is eliminated the need of attaching both ends to current supply terminals thereby affording the use of individual core bodies rather than pairs or groups thereof.

Still another object of our invention is to provide a pyrolytic processing apparatus of the type mentioned that is well suited for precipitating evolving semiconductor material upon slab- or panel-shaped core bodies. This is accomplished while securing more uniform heating over the entire precipitation-receiving width and length of the slab surfaces than can be reliably secured with apparatus of the previously known type.

To achieve these objects, and in accordance with a feature of our invention, we heat the elongated or rod-shaped core body in the reaction vessel by electric induction heating. For this purpose, we provide the apparatus with an induction heater winding whose loop is deformed to an elongated shape, having the two elongated and mutually opposite loop portions extend parallel or nearly parallel to each other. Then we mount the elongated heater winding in such a relation to the core holder of the reaction vessel that the core, when mounted, is located within the loop and has its rod axis extend parallel or nearly parallel to the elongated loop portions.

According to another feature of our invention, the induction heater winding surrounds a tubular reaction vessel in which the self-supporting core rod is mounted at only one of its ends in a core holder. The heater winding preferably has only one turn whose elongated loop portions extend substantially in a plane through the core axis as defined by the core holder.

By virtue of the fact that the induction heater winding is elongated and extends along and around the longitudinal extent of the core surface that is to receive the pyrolytically precipitated semiconductor material, this entire active portion of the core body, extending over the predominant portion of its length, is simultaneously heated, although no current terminals for the direct supply of electric current to the core body are employed. As a result, the interior of the reaction vessel can be kept completely free of metal.

The above-mentioned and further objects and features of our invention, said features being set forth with particularity in the claims annexed hereto, will be apparent from, and will be mentioned in, the following with reference to embodiments of apparatus according to the invention illustrated by way of example on the accompanying drawing in which:

FIG. 1 is a sectional front view of a first embodiment.
FIG. 2 is a sectional back view of the same apparatus seen from the right of FIG. 1.
FIG. 3 is a cross section along the line III—III in FIG. 1; and
FIG. 4 shows the lower portion of a modified embodiment otherwise corresponding to the view shown in FIG. 2.

According to FIGS. 1 to 3, a rod-shaped core body 2 of semiconductor material, for example silicon, is vertically mounted within a tubular vessel 3 closed at the top and consisting of quartz or similar vitreous material. The lower end of the core rod 2, having originally a uniformly thin cross section, is firmly inserted into a holder 4 consisting of quartz. If desired, the core body 2 may also be mounted horizontally or in any other position. In the latter case, however, it is preferable to support the core rod on both ends, preferably by means of corresponding holders consisting of quartz.

Heating of the rod 2 along the utilized, major extent of its length is effected by means of an induction heater winding 5 which consists preferably, and as shown, of a metal strip made of copper. The winding 5 is elongated in the direction of the rod axis as defined by the mounting axis of the holder 4, the two elongated sides of the winding loop extending parallel to each other and substantially parallel to the just-mentioned axis. It is preferable to give the induction heater coil 5 only one turn, also as illustrated. The shape of the winding 5 is such that it closely follows the external contour of the bell-shaped vessel portion. At the lower side of the elongated winding 5, its loop side is formed by a ring-shaped portion 6 that surrounds the vessel 3 on a circle or semicircle. As a result, the induction-field lines passing through the interior of the loop are subjected to smallest feasible deformation. The tubular vessel 3 can readily be inserted from above through the ring-shaped portion 6 of the heater winding. It is advisable to provide for cooling of the induction winding 5. For this purpose a pipe 7 is soldered upon and along the outer face of the copper strip that forms the winding 5, thus permitting a coolant, preferably water, to pass through the pipe 7 during the pyrolytic operation of the apparatus, the flow of coolant being indicated by arrows 8. The reaction vessel 3 is downwardly closed by a bottom portion 9 relative to which it is sealed by means of a conical ground and polished engagement at 10. The holder 4 for the core rod 2 is preferably mounted on the bottom portion 9. This permits readily inserting the self-supporting core body 2, before placing the tubular vessel 3 upon the bottom portion 9 and thereby sealing the reaction space of the vessel. The bottom portion 9 is provided with a nozzle 11 through which the reaction-gas mixture is blown into the vessel space. The waste gases leave the vessel through a nipple 12 also provided in the bottom portion 9. It is advisable to produce the entire bottom portion of quartz. Suitable pipe or hose lines for the gas can be attached to corresponding conical sealing portions at the external ends of the nozzle 11 and the nipple 12 respectively.

As mentioned, the core body 2 originally has a thin cross section corresponding to that of the mounted lower end 2b. The precipitating semiconductor material, causing the rod to grow in thickness within the heating range of the winding 5, gradually increases the cross section to a larger size, such as shown in FIG. 1. This gradual increase in cross section makes it necessary to correspondingly increase or regulate the current supplied to the induction heater winding 5.

It has been found that an apparatus according to the invention affords the further advantage in that a considerably smaller amount of electric power is required for heating the core body 2 than with any other form of induction heating. To prevent the vessel from being excessively heated and soon becoming opaque by precipitating semiconductor material, the walls of the reaction vessel must have a certain minimum distance from the core body. If, under such conditions, a cylindrical coil is placed about and along the elongated reaction vessel for heating the rod simultaneously over its entire length to be pyrolytically effective, then a relatively great amount of current must be supplied to permit a sufficient heating of a relatively thin core rod. In contrast thereto, it has been found that in an apparatus according to the invention, having the core rod extend substantially transverse to the field of the induction winding, a considerably better inductive coupling is achieved so that heating of thin carrier rods becomes possible with a lower amount of heating power. Thus, the use of a high-frequency generator operating at a frequency of about 4 megacycles per second, permits walls of 6 to 7 mm. diameter to be heated over a length of about 20 cm. to the temperature necessary for pyrolytic dissociation and precipitation of silicon. This requires a heating power of about 5 kilowatts (in the apparatus illustrated in FIGS. 1 to 3). The diameter of the tubular quartz vessel used was about 8 cm., the distance between the two parallel loop portions of the winding 5 was about 10 cm.

The rod-shaped core body 2 is so effectively coupled inductively with the induction winding 5 at those surface areas that are closer to the winding, that these particular areas tend to assume a higher temperature. This may result in non-uniform precipitation of the semiconductor material on the surface of the core body. However, if uniform precipitation is desired, it can readily be secured by rotating the carrier rod 2 about its own axis during the precipitation process, for example at a rate of 1 to 500 rotations per minute. For this purpose, the holder 4 may be mounted on a shaft 13 according to FIG. 4 which extends toward the outside of the processing vessel and carries a gear 14 by means of which the rotary movement is imparted to the holder 4. It will be understood that such a modified apparatus, illustrated in FIG. 4, is preferably provided with suitable supporting means for the bottom portion 9' of the vessel which also comprises a bearing (not shown) for the lower end of the shaft 13.

On the other hand, non-uniform precipitation of semiconductor material can be utilized to advantage for the purpose of producing plate-shaped semiconductor bodies as needed for many electronic semiconductor devices. For this purpose, a slab-shaped core body, instead of a body having a circular cross section, is mounted in the holder 4 of apparatus according to FIGS. 1 to 3, and the elongated slab can then be placed in the position where the slab faces have substantially uniform spacing from the elongated and parallel loop portions of the heater winding.

By admixing doping substances to the reaction-gas mixture, the precipitating semiconductor material can be given any desired conductance type or dopant concentration. The doping admixture may be added in the form of a dopant-halogen compound. For example, in order to dope silicon or germanium with boron or phosphorus, the reaction-gas mixture essentially consisting of hydrogen and silicon or germanium halide, may be given an admixture of boron trichloride or phosphorus trichloride. The carrier body 2 preferably consists of a monocrystal. In this case, the pyrolytic reaction can be performed in such manner that the growth of material on the core is likewise monocrystalline.

Since in most cases the carrier rod 2 consists of hyperpure semiconductor material, it is necessary to preheat the core before it can be inductively heated. One way of preheating the core is to fill the reaction vessel with hydrogen and then heat it from the outside, for example with the aid of a flame. Another way of preheating is to heat the carrier rod by heat (infrared) radiation from the outside through the quartz vessel, for example with the aid of hollow mirrors and reflectors of the like. Still another manner of preheating is to fill the reaction vessel initially with a gas at negative pressure, for example 15 mm. Hg, and then producing a gas discharge with the aid of the induction winding 5 in the vessel, such discharge heating the carrier rod 2 to the extent required to make it susceptible to inductive current.

To those skilled in the art, it will be obvious upon a study of this disclosure that apparatus according to our invention can be modified in various respects and can be employed for various modes of processing allowing the invention to be given embodiments other than particularly illustrated and described herein, without departing from the essential features of the invention and within the scope of the claims annexed hereto.

We claim:

1. Apparatus for pyrolytic precipitation of semiconductor material upon an elongated, electrically heated core from gas containing a pyrolytically dissociable compound of the semiconductor material, comprising a reaction vessel having duct means for supplying the gas and having holder means for fastening the elongated core in the vessel, said holder means defining a core axis during precipitating operation, an induction heater winding for heating the core, said winding having an elongated loop shape and having the two elongated and mutually opposite loop portions extend substantially parallel to said core axis along diametrically opposite sides thereof.

2. Apparatus for pyrolytic precipitation of semiconductor material upon an elongated, electrically heated core from gas containing a pyrolytically dissociable compound of the semiconductor material, comprising an elongated tubular reaction vessel with duct means for providing a gas flow therein, holder means in said vessel for mounting the elongated core, said holder means defining a mounted-core axis substantially coincident with the tubular-vessel axis, an induction heater winding for heating the core, said winding forming an elongated loop within which said vessel is located said loop having a direction of elongation parallel to said vessel axis and in a plane substantially through said axis.

3. Apparatus for pyrolytic precipitation of semiconductor material upon an elongated, electrically heated core from gas containing a pyrolytically dissociable compound of the semiconductor material, comprising a reaction vessel having gas ducts, holder means disposed in said vessel for mounting the elongated core and defining the axis of the core when mounted, a single-turn induction winding having elongated loop shape and having its two elongated loop portions extend parallel to said axis and substantially in a plane through said axis.

4. In pyrolytic apparatus for precipitation of semiconductor material according to claim 1, said holder means being rotatable about said core axis relative to said vessel.

5. In pyrolytic apparatus for precipitation of semiconductor material according to claim 1, said core having the shape of a flat slab.

6. Apparatus for pyrolytic precipitation of semiconductor material upon an elongated, electrically heated core from gas containing a pyrolytically dissociable compound of the semiconductor material, comprising an elongated tubular reaction vessel with duct means for providing a gas flow therein, a single core holder mounted in the lower portion of said vessel and being engageable in a vertical direction with the lower end of a vertically insertable core so as to define in said vessel a vertical axis for the mounted core, an induction heater winding for heating the core, said winding being vertically elongated and having its two vertical portions extend substantially parallel to said axis on horizontally opposite sides thereof, and the elongated width of said winding being more than equal to the axial length along which the core is to be heated.

7. Apparatus for pyrolytic precipitation of semiconductor material upon an elongated, electrically heated core from gas containing a pyrolytically dissociable compound of the semiconductor material, comprising an elongated tubular reaction vessel with duct means for providing a gas flow therein, holder means in said vessel for mounting the elongated core, said holder means having a vertical core-holding axis, an induction heater winding for heating the core, said winding forming a vertically elongated loop within which said vessel is located, said winding having its two vertical portions extend substantially parallel to said axis on horizontally opposite sides thereof, and the elongated width of said winding being more than equal to the axial length along which the core is to be heated.

8. In pyrolytic apparatus for precipitation of semiconductor material according to claim 7, said tubular reaction vessel having a closed top, said vertically elongated induction heater winding extending over the top of said vessel and having a substantially horizontal bottom portion of annular shape extending about said tubular vessel and interconnecting said two vertical loop portions of said winding.

9. In pyrolytic apparatus for precipitation of semiconductor material according to claim 8, said heater winding having only one turn and consisting essentially of a flat metal strip with the inner face of the strip facing said vessel, and a fluid-coolant pipe surrounding said winding along, and in bonded junction with, the outer face of said strip.

No references cited.

MORRIS KAPLAN, *Primary Examiner.*